(12) United States Patent
Yano et al.

(10) Patent No.: US 11,313,017 B2
(45) Date of Patent: Apr. 26, 2022

(54) HARD SINTERED BODY

(71) Applicant: MITSUBISHI MATERIALS CORPORATION, Tokyo (JP)

(72) Inventors: Masahiro Yano, Naka (JP); Akio Nishiyama, Kyoto (JP); Susumu Morita, Osaka (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 175 days.

(21) Appl. No.: 16/493,197

(22) PCT Filed: Mar. 12, 2018

(86) PCT No.: PCT/JP2018/009411
§ 371 (c)(1),
(2) Date: Sep. 11, 2019

(87) PCT Pub. No.: WO2018/168735
PCT Pub. Date: Sep. 20, 2018

(65) Prior Publication Data
US 2020/0010372 A1   Jan. 9, 2020

(30) Foreign Application Priority Data
Mar. 13, 2017   (JP) .............................. JP2017-047638

(51) Int. Cl.
*C22C 29/02*   (2006.01)
*C22C 29/00*   (2006.01)

(52) U.S. Cl.
CPC ............ *C22C 29/02* (2013.01); *C22C 29/005* (2013.01); *C22C 2202/00* (2013.01)

(58) Field of Classification Search
CPC ... C22C 29/02; C22C 29/005; C22C 2202/00; C04B 2235/6581; C04B 35/6265;
(Continued)

(56) References Cited

U.S. PATENT DOCUMENTS

| 3,451,791 A | 6/1969 | Meadows | |
|---|---|---|---|
| 2004/0052593 A1* | 3/2004 | Anderson | ........... C04B 35/5626 407/119 |
| 2006/0171099 A1* | 8/2006 | Barber | .................... C04B 35/64 361/321.2 |

FOREIGN PATENT DOCUMENTS

| CN | 1450188 A | 10/2003 |
|---|---|---|
| JP | 02-043330 A | 2/1990 |

(Continued)

OTHER PUBLICATIONS

JPH0243330A—Espacenet English machine translation (Year: 1990).*

(Continued)

*Primary Examiner* — Alexandra M Moore
*Assistant Examiner* — Adil A. Siddiqui
(74) *Attorney, Agent, or Firm* — Leason Ellis LLP

(57) ABSTRACT

The present invention provides a sintered body containing W and WC, having excellent hardness, strength, compactness, and corrosion resistance, without containing $W_2C$, and capable of being used for the purpose of a cutting tool or a glass molding die, or a seal ring. There is provided a sintered body containing 4 to 50 vol % of tungsten metal as binder phases, 50 to 95 vol % of tungsten carbide (WC), and 0.5 to 5.0 vol % of tungsten oxide ($WO_2$), in which the tungsten oxide ($WO_2$) has an average grain size of 5 nm to 150 nm and is present in a sintered body structure at an average density of 5 to 20 particles/$\mu m^2$.

3 Claims, 3 Drawing Sheets

(58) Field of Classification Search
CPC ...... C04B 2235/404; C04B 2235/3258; C04B 2235/5454; C04B 2235/5445; C04B 2235/77; C04B 2235/96; C04B 2235/6583; C04B 2235/785; C04B 35/5626; B22F 2999/00; B22F 2005/001
USPC .......................................................... 419/18
See application file for complete search history.

(56) References Cited

FOREIGN PATENT DOCUMENTS

| JP | H0243330 A | * | 2/1990 | | |
|----|------------|---|--------|---|---|
| JP | 07-010517 A | | 1/1995 | | |
| JP | 07-054001 A | | 2/1995 | | |
| JP | 2004-131769 A | | 4/2004 | | |
| JP | 2005-336536 A | | 12/2005 | | |
| JP | 2009082936 A | * | 4/2009 | .............. | B01J 23/52 |
| JP | 4713119 B | | 6/2011 | | |
| WO | WO-2018/003877 A1 | | 1/2018 | | |

OTHER PUBLICATIONS

JP-2009082936-A—Espacenet English machine translation (Year: 2009).*
Humphrey-Baker, Oxidation resistant tungsten carbide hardmetals, 2017, International Journal of Refractory Metals and Hard Materials (Year: 2017).*
Hara et al., "Studies on Direct Carburization of WC from the Mixture of $WO_3$ and Carbon", *Japan Society of Powder and Powder Metallurgy*, Sep. 25, 1974, pp. 12-16, vol. 22, 1.
International Search Report dated Apr. 3, 2018 for the corresponding PCT International Application No. PCT/JP2018/009411.
Chinese Office Action dated Sep. 30, 2020 for the corresponding Chinese Patent Application No. 201880017166.0.
European Search Report dated Jul. 7, 2020 for the corresponding European Patent Application No. 18767653.1.

* cited by examiner

1μm

Binarization image obtained by processing WO$_2$ regions
(Black: WO$_2$; White: W and WC)

HARD SINTERED BODY

CROSS-REFERENCE TO RELATED PATENT APPLICATIONS

This application is a U.S. National Phase Application under 35 U.S.C. § 371 of International Patent Application No. PCT/JP2018/009411, filed Mar. 12, 2018, and claims the benefit of priority to Japanese Patent Application No. 2017-047638 filed on Mar. 13, 2017, all of which are incorporated herein by reference in their entirety. The International Application was published in Japanese on Sep. 20, 2018 as International Publication No. WO/2018/168735 under PCT Article 21(2).

FIELD OF THE INVENTION

The present invention relates to a sintered body in which WC (tungsten carbide) particles known to have high hardness, high strength, and high melting point ceramic are set as a hard phase, and W (tungsten metal) having excellent affinity with the WC and the same high strength and high melting point as those of the WC is set as a binder phase. The sintered body according to the invention has excellent high-temperature hardness, high-temperature strength, and excellent compactness or fracture toughness, and accordingly, the sintered body can be used as a blade edge material of a cutting tool or a wear resistant tool material such as a mold used at a high temperature.

BACKGROUND OF THE INVENTION

A sintered body using Co as a metal binder phase is well known as a hard sintered body using WC.

In a composite material formed of a ceramic hard phase and a metal binder phase, both high hardness of the hard phase and high strength of the metal phase are expected, but in general, the ceramic has poor wettability with metal and hardly exhibit high strength. Meanwhile, a sintered body containing WC and Co is a material which exhibits high strength due to extremely unusual properties in that the wetting angle of both becomes substantially zero at a high temperature at which Co is melted, and withstands severe use conditions such as withstood as a cutting tool.

However, WC and Co do not have sufficient bonding power at a normal temperature range, and accordingly, there is a problem regarding vulnerability such that a boundary between WC and Co becomes a starting point of fracture.

In the sintered body containing a metal binder phase, a problem regarding hardness or corrosion resistance at a high temperature may occur, in the use of cutting or deep cutting of quenched steel, in which a blade edge temperature during the cutting becomes a higher temperature, or in the use of seal ring in which corrosion resistance is required in a chemical device or the like.

On the other hand, for example, according to Japanese Patent No. 4713119, a sintered body using W as a binder phase, without using Co, and using WC as a hard phase has been introduced in British Patent No. 504522, and specifically, it is claimed that the sintered body is obtained by sintering a mixed powder consisting of 60% to 80% of WC, 15% to 35% of W, and/or 7% to 23% of Mo, and a small amount of Co, Si, or B at 1750° C. to 1900° C. under pressure of 16.5 MPa.

However, in Japanese Patent No. 4713119, the sintered body obtained by doing so is brittle due to low hardness, and a reason for that is assumed that it is because the most portion of W is changed into $W_2C$ having low hardness and low strength. Accordingly, in the same document, in order to solve such a problem, a method of performing wet grinding and drying a powder mixture formed of W having 18 weight % or 10 weight % and a remainder WC having a FSSS grain size of 0.25 μm obtained by a grain size test method by Fischer process, performing hot press at 1800° C. under 30 MPa, and processing in argon gas at 1200° C. for 8 hours has been proposed, as a specific producing method.

A hard material obtained by such a producing method has excellent hardness (Hv) at room temperature and has a peak ratio $W_2C(101)/W(110)$ of an X-ray diffraction pattern of less than 0.3, and a cutting tool insert having excellent cutting properties is obtained.

Technical Problem

Both of W and WC used as raw materials in the invention are known as high-melting-point materials having a melting point equal to or higher than 3300° C., and in the producing of a sintered body having excellent corrosion resistance and containing these, it is necessary to perform sintering at a high temperature equal to or higher than 1500° C.

However, as shown in W—WC state view of FIG. 1 (see D. K. Gupta and L. LSeigle; Metallurgical Transactions A, vol. 6A (1975) p. 1941), in a case where carbon is contained at a temperature range of 1400° C. to 1450° C., $W_2C$ having low hardness and low strength is generated, and accordingly, in a W and WC-based sintered body, it is necessary to extremely prevent generation of $W_2C$ having low hardness and low strength.

Tables 1 and 2 show physical property values and mechanical property values of each of W, WC, and $W_2C$, but as clearly shown in Table 2, the hardness of $W_2C$ is deteriorated by approximately 45% with respect to that of WC. (Table 1 refers to Chemical Dictionary 5, pocket edition 34, Chemical Dictionary Editorial Committee editing, Kyoritsu Shuppan Co., Ltd., and Table 2 refers to Table 1 of Japanese Unexamined Patent Application, First Publication No. H11-79839.)

TABLE 1

| | Melting point | Crystal structure | Lattice constant (A) |
|---|---|---|---|
| W | 3.382° C. | bcc | 3.156 |
| WC | 2.600° C. (decomposition) | hcp | a = 2.900, c = 2.831 |
| $W_2C$ | 2.860° C. | hcp | a = 2.98, c = 4.71 |

TABLE 2

| | Vickers hardness (GPa) | Young's modulus (GPa) | Poisson's ratio | Toughness (MPa · m$^{1/2}$) |
|---|---|---|---|---|
| WC | 26 | 690 | 0.21 | 6.0 |
| $W_2C$ | 14 | 390 | 0.28 | 7.0 |

Regarding such a problem, in Japanese Patent No. 4713119, as described above, the amount of $W_2C$ can be decreased, by a heat treatment in two stages, that is, first, obtaining a structure in which a significant amount of $W_2C$ is generated, but the amount of voids is small, by consolidating at a temperature higher than 1500° C. in accordance with the use of tungsten which is a high-melting-point metal as a binder phase, in the heat treatment in the first stage, and then, performing the heat treatment in an inert atmosphere at 1250° C. or vacuum, and changing $W_2C$ into W and WC again, as the heat treatment in the second stage.

However, even by using the method disclosed in Japanese Patent No. 4713119, $W_2C$ still remains, and in the heat treatment described above, it is difficult to control dispersion or size of $W_2C$ in the structure, and accordingly, coarse $W_2C$ having low strength remains in the sintered body, and in a case where the sintered body having such a structure is used as a tool, $W_2C$ becomes a starting point of fracture under conditions of high load, and therefore, a problem regarding significant life shortening occurs.

Therefore, an object of the invention is to obtain a structure which does not contain $W_2C$ at all at an X-ray diffraction level even in a high content region of WC, in a sintered body containing W and WC, and to provide a sintered body that has excellent hardness, strength, fracture toughness, compactness, and corrosion resistance, and that can also be used for the purpose of seal ring or the like, in addition to a blade edge material of a cutting tool or wear-resistant material such as a mold used at a high temperature.

SUMMARY OF THE INVENTION

Solution to Problem

The invention obtains a sintered body having excellent high hardness, high strength, compactness, and corrosion resistance, by finding new means for preventing generation of $W_2C$ causing a decrease in strength, in a sintered body containing a hard phase formed of WC particles known as carbide having high hardness, high strength, and a high melting point, and W having excellent affinity with the WC and having high strength and a high melting point, the same as those of the WC, and the invention also solves the problem described above, by providing an extremely useful sintered body having excellent fracture toughness, in addition to high hardness, high strength, compactness, and corrosion resistance, by controlling oxygen applied to a surface of a raw material powder, finely dispersing fine grains $WO_2$ obtained by reacting oxygen of the surface and W to each other in the structure, preventing grain growth of W and WC particles, setting the sintered body to have a structure formed of fine particles, and deflecting an edge of a crack generated in the sintered body to be difficult to be developed.

That is, the preventing of the generation of $W_2C$ having low strength has been found by performing processes under various producing conditions. For example, as W powder and WC powder which are raw material powders, at least W powder is nano-sized fine powder, and each grain size is adjusted in a suitable range by using powder having low aggregation properties and a small amount of mixed impurities. As a sintering method, the sintering in a low temperature range equal to or lower than 1450° C. at which $W_2C$ is not generated as a stable phase, in the W—WC state view, that is, a low temperature sintering method is used. Accordingly, it is found that a dense sintered body having high hardness and high strength is obtained without generation of $W_2C$. At this time, if necessary, it is also advantageous to use a hot press method or a discharge plasma sintering method (SPS method) of pressing at the time of the sintering.

Regarding the refining of the W powder which is the raw material powder described above, as a method of refining the metal powder, a method of refining by a method of strong pulverization for a long period of time by a pulverizer such as a ball mill or mechanochemical method of the related art was used. However, in these methods, the refining to a submicron level could be performed, but it was difficult to realize a size of 100 nm or less. Even in the refining of the submicron level, as the strong pulverization is performed, the amount of mixed impurities from a pulverizer or ball increases, and a compound of impurities is formed at the time of the sintering of W and WC, and accordingly, a problem regarding a decrease in strength also occurred. In addition, in a typical wet method, after fine pulverization, the powder is easily aggregated during drying a slurry containing the powder, and the formation of aggregated powder was a reason for a decrease in sinterability or in strength of the sintered body.

Therefore, in the invention, W fine powder having an average grain size equal to or smaller than 140 nm having small aggregation properties is produced by using a hydrogen reduction method under ultra-low partial water vapor pressure, the obtained W fine powder and WC fine powder are mixed with each other and sintered through pressing at a temperature equal to or lower than 1450° C., and accordingly, a dense sintered body having high hardness and high strength is obtained without generation of $W_2C$. In addition, by controlling the amount of oxygen applied to the surface of the raw material powder to be a suitable amount, fine grains $WO_2$ are generated during the sintering and finely dispersed in the sintered body structure, grain growth of W and WC particles is prevented, and an edge of a crack generated in the sintered body is deflected to be difficult to be developed, and therefore, the improvement of fracture toughness of the sintered body is realized.

That is, in the nano-sized powder used in the invention, as the surface area increases, a cleanliness of the surface becomes important, and in a case where the cleanliness of the surface is poor, reactivity of the surface of W particles or WC particles is deteriorated, and adhesiveness of WC and W is deteriorated. Here, in the invention, the W fine powder is produced by using the hydrogen reduction method under ultra-low partial water vapor pressure, and accordingly, the W powder having an extremely small amount of adsorption water is obtained, and the cleanliness is high. However, due to the high cleanliness, the reactivity between WC and W or W and W increase, the grain growth is easily performed during the sintering, and a problem regarding coarsening of particles occurred.

Therefore, regarding such a problem, the amount of oxygen on the surface of the raw material powder is adjusted, and sintering conditions, that is, a sintering temperature or a sintering time is controlled, and accordingly $WO_2$ is generated by the reaction between oxygen and W applied to the surface in advance. By finely dispersing the generated $WO_2$ in the sintered body structure, the grain growth of the WC particles and the W particles is prevented, and the structure of $WO_2$ and W having low hardness compared to WC is set as a fine structure, and therefore, a sintered body having a high fracture toughness value is realized.

The invention is made based on the findings described above, and provides:

(1) a sintered body containing 4 to 50 vol % of tungsten metal as binder phase, 50 to 95 vol % of tungsten carbide (WC), and 0.5 to 5.0 vol % of tungsten oxide ($WO_2$), in which the tungsten oxide ($WO_2$) has an average grain size of 5 nm to 150 nm and is present in a sintered body structure at an average density of 5 to 20 particles/$\mu m^2$.

The configuration of the invention will be further described below.

<Component Composition of Sintered Body>
W, WC:

W forms a metal binder phase, and in a case where a content thereof is less than 4 vol %, and even in a case where an average grain size of W is nanosize, W cannot be sufficiently disposed around the WC particles, sinterability is deteriorated, and a dense sintered body structure is not obtained. In contrast, in a case where the content thereof is more than 50 vol %, the hardness is not sufficient, and accordingly, the amount of W was regulated to be 4 to 50 vol %.

The amount of WC was set as 50 to 95 vol %, as the amount necessary for expecting high hardness.

$WO_2$:

$WO_2$ is necessary for realizing improvement of toughness of the sintered body structure. In a case where a content thereof is 0.5 vol % or less, an edge of developing crack is not deflected to be difficult to be developed, and this causes a decrease in toughness of the sintered body structure. In a case where the content thereof is 5.0 vol % or more, a percentage of $WO_2$ increases in the structure, oxygen before becoming as $WO_2$ deteriorates sinterability, as a result, brittleness of the sintered body increases, and therefore, the amount thereof was set as 0.5 to 5.0 vol %.

With respect to the structure, in order to improve higher hardness and oxidation resistance of the sintered body, a part of WC can be replaced with carbide and/or carbonitride of Ti, Ta, V, Mo, and Cr.

<Sintered Body Structure>

When the sintered body according to the invention is measured by XRD, as shown in FIG. 2, only peaks of W, WC, and $WO_2$ could be confirmed, and the peak of $W_2C$ could not be confirmed, and accordingly, it was confirmed that the sintered body is formed of W, WC, and $WO_2$.

As described above, as the sintered body structure according to the invention, a dense micro structure having excellent hardness and strength was obtained, as shown in FIG. 3, by using fine powder at nano level as a raw material powder or using low-temperature sintering.

Regarding the average crystal grain sizes of the W particles, the WC particles, and the $WO_2$ particles of the sintered body structure of the invention, the average crystal grain sizes of the W particles is 5 nm to 600 nm, the average crystal grain sizes of the WC particles is 20 nm to 9000 nm, and the average crystal grain sizes of the $WO_2$ particles is 5 nm to 150 nm.

That is, the average crystal grain size of the W particles after the sintering which is smaller than 5 nm is not preferable, because the effect of holding the WC particles is small, and the average crystal grain size thereof which is greater than 600 nm is not preferable, because the shape of W is easily changed in the use under the conditions of a large amount of impact element.

The average crystal grain size of the WC particles after the sintering which is smaller than 20 nm is not preferable, because a possibility of formation of voids in the sintered body structure increases, and a dense sintered body structure is hardly obtained. In contrast, the average crystal grain size thereof which is greater than 9000 nm is not preferable, because a structure having low hardness is obtained, and a structure having high hardness is not obtained.

The average grain size of the $WO_2$ particles after the sintering which is smaller than 5 nm is not preferable, because the effect of deflecting an edge of developing crack is decreased, and toughness of the sintered body is decreased. In contrast, the average grain size thereof which is greater than 150 nm is not preferable, because $WO_2$ becomes a reason of fracture, and toughness of the sintered body is decreased.

In addition, an average number density of $WO_2$ after the sintering in the sintered body structure which is smaller than 5 particles/$\mu m^2$ is not preferable, because the effect of deflecting an edge of developing crack to be difficult to be developed is decreased and toughness of the sintered body is decreased. In a case where the average number density thereof is greater than 20 particles/$\mu m^2$, the effect of deflecting an edge of developing crack to be difficult to be developed is sufficient, but a percentage of $WO_2$ occupying the structure increases, as a result, the brittleness of the sintered body structure increases, and the toughness decreases. Therefore, the average number density thereof is set as 5 to 20 particles/$\mu m^2$.

The contents of W, WC, $WO_2$ in the sintered body can be measured by using an energy dispersion type X-ray analysis device mounted with scanning electron microscope (SEM-EDX).

That is, cross section structure of the sintered body of the invention is observed with an SEM, a secondary electron image is obtained, a mapping image of a W element, a C element, and an O element at the same portion is obtained by EDX, a portion where the W element and the C element are overlapped is set as WC, a portion where the W element and the O element are overlapped is set as $WO_2$, a portion of the W element where the C element and the O element are not overlapped is set as W, each portion is extracted by image processing, the area of each particle occupying is calculated by image analysis, the percentage of each particle occupying 1 image is obtained, the unit vol % is used for the area ratio, at least three images are processed, and the average value of obtained values is obtained as a content ratio of each particle.

Regarding the extracting of the portion of each particle in the image by the image processing, in order to clearly determine each particle portion, binarization processing of displaying image in monochrome of 256 gradations in which 0 is black and 255 is white, is performed in each case of W and WC.

As an observation region used in the image processing, a visual field region having a size of approximately 9.0 $\mu m \times 9.0$ $\mu m$ is desired.

The average crystal grain sizes of W, WC, and $WO_2$ can be measured using the SEM-EDX.

That is, the cross section structure of the sintered body of the invention is observed with the SEM, a secondary electron image is obtained, a mapping image of a W element, a C element, and an O element at the same portion is obtained by EDX, a portion where the W element and the C element are overlapped is set as WC, a portion where the W element and the O element are overlapped is set as $WO_2$, a portion of the W element where the C element and the O element are not overlapped is set as W, and the binarization processing is performed by image processing to perform the extraction.

Regarding the extracting of the portion of each particle in the image by the image processing, in order to clearly determine each particle portion, binarization processing of displaying image in monochrome of 256 gradations in which 0 is black and 255 is white, is performed.

After the binarization processing, a process of separating the portion considered that the grains are in contact, for example, the separation is performed by watershed which is one image processing operation.

The portion (black portion) of each particle in the image obtained after the binarization processing, is particle-analyzed, the obtained maximum length is set as a maximum length of each particle, and each is set as a diameter of each particle, and a volume of each particle is calculated. The volume is calculated by assuming an ideal sphere. When performing the particle analysis, a length per 1 pixel (µm) is set in advance by using a value of scale known by the SEM.

A graph is drawn by setting a vertical axis as a volume percentage [%] and a horizontal axis as a diameter [µm] based on the accumulated volume of each volume of particle, the diameter in a case where the volume percentage is 50% is set as the average grain size, the average value obtained from at least three images is set as the average crystal grain size, and respectively average crystal grain sizes (nm) of W, WC, and $WO_2$ are obtained.

As the observation region used in the image processing, a visible field region having a size approximately 5 µm×5 µm is desirable.

A density of $WO_2$ grains present in the sintered body can be measured by the SEM-EDX. That is, the cross section structure of the sintered body of the invention is observed with the SEM, a secondary electron image is obtained, a mapping image of a W element and an O element at the same portion is obtained by EDX, a portion where the W element and the O element are overlapped is set as $WO_2$, and the binarization processing is performed by image processing to perform the extraction.

Regarding the extracting of the portion of each particle in the image by the image processing, in order to clearly determine each particle portion, binarization processing of displaying image in monochrome of 256 gradations in which 0 is black and 255 is white, is performed.

After the binarization processing, a process of separating regions considered that the $WO_2$ grains are in contact with each other, for example, watershed that is one of image processing operations, is performed.

The portion (black portion) of $WO_2$ grain in the image obtained after the binarization processing, is particle-analyzed, and a particle number is calculated.

The area is obtained from measured vertical and horizontal lengths of the image, the particle number calculated in advance is divided by this area, and accordingly, the density of $WO_2$ grains present in the sintered body is obtained, an average value obtained from at least three images was set as an average density (particles/µm$^2$) of $WO_2$ present in the sintered body.

As the observation region used in the image processing, a visible field region having a size approximately 5 µm×5 µm is desirable.

The density of the sintered body was measured by using the Archimedes method and was calculated using the mass of a sample measured in the air, the mass of a sample measured in water, and a density of water. The density of water was set as a density of water obtained by a water temperature during the measurement.

<Method for Producing Sintered Body>

A method for producing the sintered body according to the invention will be specifically described below.

Producing of Raw Material Powder:

As a raw material, the W powder and the WC powder having nanosize are used.

As the W fine powder, as described above, for example, the W fine powder having an average grain size equal to or smaller than 140 nm produced using hydrogen reduction method under ultra-low partial water vapor pressure may be used, and the average grain size thereof is preferably 5 nm to 80 nm.

In addition, the particle size of the WC having excellent sinterability of the WC fine powder can be selected from nanosize to µm size, in accordance with the average grain size of the W powder, is preferably 15 nm to 9000 nm and more preferably 30 nm to 7000 nm.

In order to apply oxygen to the surface of each particle of the produced W fine powder, for example, the W fine powder is exposed to a mixed atmosphere of $N_2$ and $CO_2$, and accordingly, the W fine powder, in which oxygen is evenly applied to the surface of each W particle, is produced.

Next, 5 to 50 vol % (6 to 55.2 mass %) of the W fine powder and 50 to 95 vol % (44.8 to 93.9 mass %) of the WC powder subjected to the selected preprocessing were wet-mixed with an organic solvent using a carbide container and a carbide ball, and then dried.

In order to adjust the amount of oxygen of the mixed powder after the drying, for example, a heating process was performed at a temperature of 100° C. to 1300° C. under a vacuum atmosphere of pressure of 1 Pa, and a raw material mixed powder having the adjusted amount of oxygen was obtained.

As described above, more preferable average grain size of the W fine powder is set to be equal to or greater than 5 nm, because, in a case where the average grain size is less than 5 nm, it is difficult to produce a powder having small aggregation properties, and in a case where the powder is aggregated, it is difficult to evenly apply oxygen to the surface, the aggregated portion has high reactivity during the sintering, the grain growth easily occurs, and as a result, the toughness of the sintered body may decrease.

In addition, as the average grain size of the WC fine powder is small, the sintered body having high hardness is obtained. In this case, the surface area of the WC powder increases, and in order to obtain a dense sintered body, a large amount of W powder is contained or it is necessary to decrease the average grain size of the W powder, and accordingly, the optimal average grain size of the WC powder was selected from the average grain size and amount of the W powder.

Regarding the average grain size of each raw material powder, a BET method was used for the nano-level powder, and a laser diffraction method was used for µm-level powder.

Producing of Sintered Body:

The obtained raw material mixed powder was press-molded at a molding pressure of 1 MPa by hydraulic press or the like, and a molded body was produced. Then, high-pressure low-temperature sintering was performed under conditions in which the pressure is 50 MPa to 10 GPa, the temperature is equal to or higher than 1450° C., and the holding time is 5 to 120 minutes.

<Formation of Surface Coating>

A cutting tool was produced from the sintered body according to the invention by a cutting process, a TiCN and $Al_2O_3$ layer is coated on the surface thereof by a CVD method, and a coating tool was produced. A dramatically long life was shown under the cutting conditions of high speed and high depth where the temperature of the blade edge becomes a high temperature, and the sintered body showed excellent properties as a cutting tool in which a temperature of a blade edge easily becomes a high temperature. This sintered body also has excellent corrosion resistance and can be used for the purpose of seal ring or the like. The sintered body is also advantageous as a die for molding of glass lens.

Advantageous Effects of Invention

The invention provides a sintered body containing a hard phase formed of WC particles known as ceramic having high hardness, high strength, and a high melting point, and a binder phase formed of W having excellent affinity with the WC and having high strength and a high melting point, the same as those of the WC, and a tungsten oxide phase finely dispersed in a sintered body structure, and having high hardness, high strength, compactness, corrosion resistance, and excellent fracture toughness, by performing refining of the raw material powder, adjustment of grain size to a suitable range, and adjustment of the amount of oxygen applied to the surface, further adjusting the sintering conditions, particularly, the sintering temperature, preventing generation of $W_2C$ causing a decrease in strength, and dispersing and precipitating the fine tungsten oxide in the structure.

DETAILED DESCRIPTION OF THE INVENTION

Next, a sintered body of the invention will be described in detail with reference to examples.

Examples

As a raw material powder, WC powder having a predetermined average grain size and W fine powder having a surface, to which oxygen is applied, were prepared (sample no. 1 to 8 of Table 3), these raw material fine powders were blended and mixed to have a predetermined composition, the sintering was performed using the raw material mixed powder sintered under the conditions shown in Table 3, and accordingly, the present invention sintered bodies 1 to 8 were produced.

For comparison, by performing the sintering with respect to the raw material powder (sample no. 12 of Table 3) having a blending composition beyond the present invention range shown in Table 3, a comparative example sintered body 12 was produced.

For comparison, in the same manner, by performing the sintering with respect to the raw material powder (sample no. 11 and 13 of Table 3) which satisfies the blending composition of the present invention range shown in Table 3, but in which oxygen was applied under the conditions beyond the present invention range (100° C. to 1300° C.), and the raw material powder (sample no. 14 of Table 3), in which the oxygen was not applied, comparative example sintered bodies 11, 13, and 14 were produced.

For comparison, in the same manner, by performing the sintering with respect to the raw material powder (sample no. 15 of Table 3) having the blending composition of the present invention range shown in Table 3 at the sintering temperature beyond the present invention range, a comparative example sintered body 15 was produced.

Regarding the present invention sintered bodies 1 to 8 and the comparative example sintered bodies 11 to 15 obtained as described above, the cross section structure thereof was observed with an SEM (magnification: 10000 times), an average crystal grain size of crystal grains of W, WC, and $WO_2$ configuring the sintered body obtained by the image processing and the number per unit area of $WO_2$ are shown in Table 4.

In the same manner, regarding the present invention sintered bodies 1 to 8 and the comparative example sintered bodies 11 to 15, a density and a fracture toughness value were also measured and shown in Table 4.

In addition, regarding the present invention sintered bodies 1 to 8 and the comparative example sintered bodies 11 to 15, the presence or absence of $W_2C$ was confirmed by XRD measurement, and the presence amount is shown in Table 4 as a ratio of peak strength of (101) plane of $W_2C$ with respect to peak strength of (110) plane of W.

Figure 1:
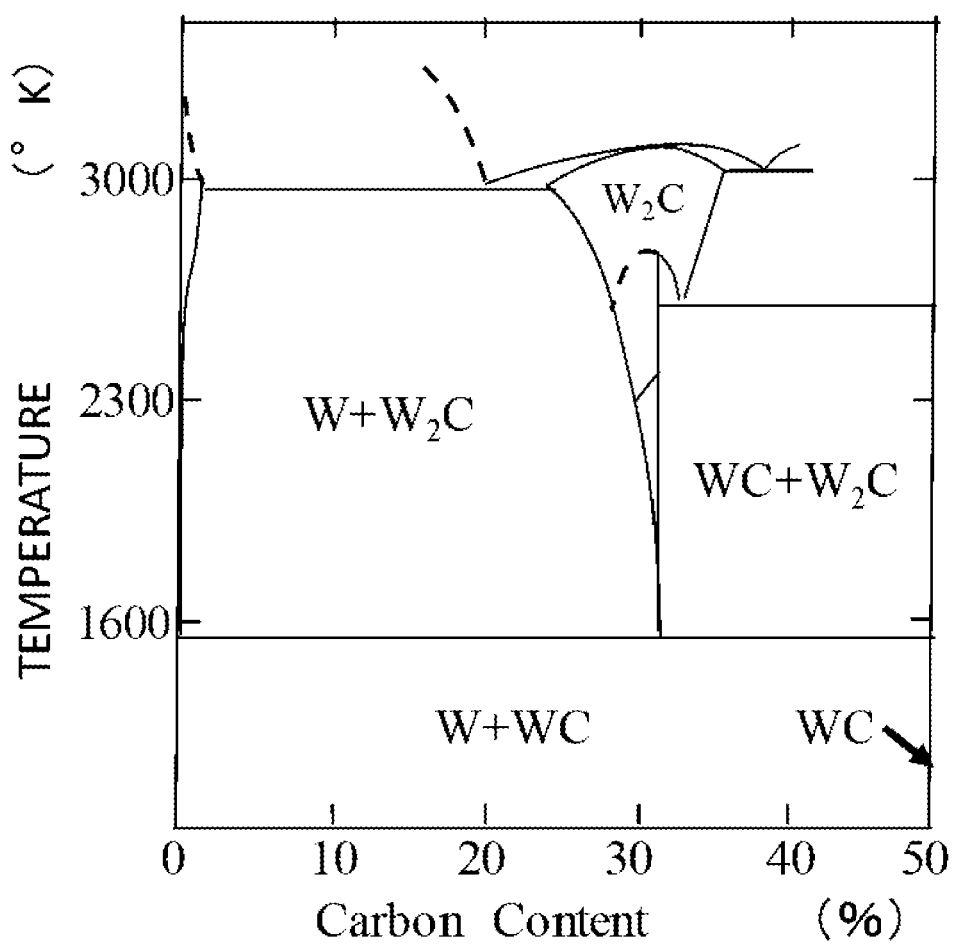
FIG. 1 is a W—WC state view, and shows that $W_2C$ having low strength is generated, in a case where carbon is contained, in a temperature range of 1400° C. to 1450° C. The horizontal axis is atom % of carbon.
Figure 2:
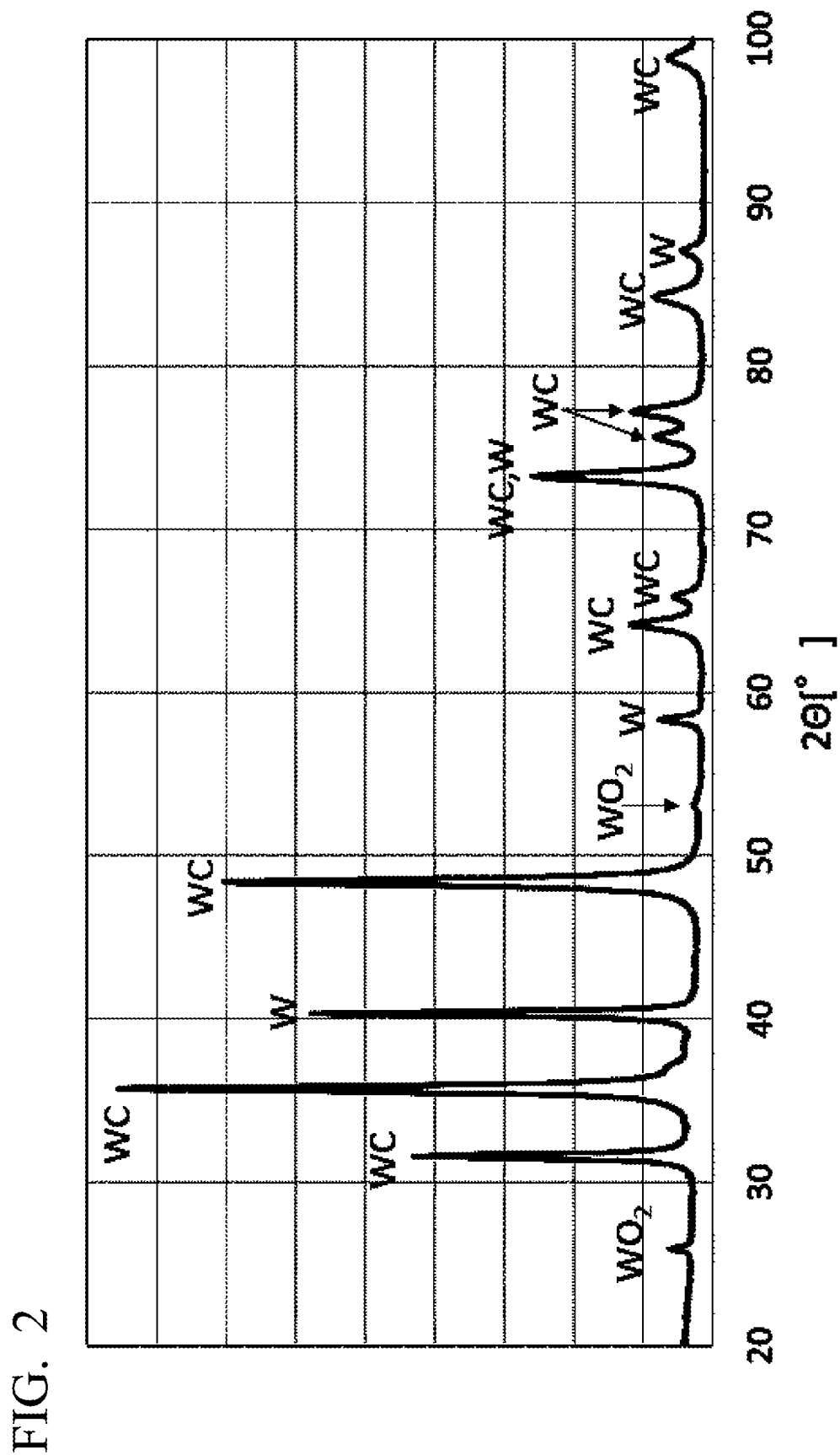
FIG. 2 shows a measurement result of XRD regarding a sintered body containing W—WC—$WO_2$ according to the invention.
Figure 3:
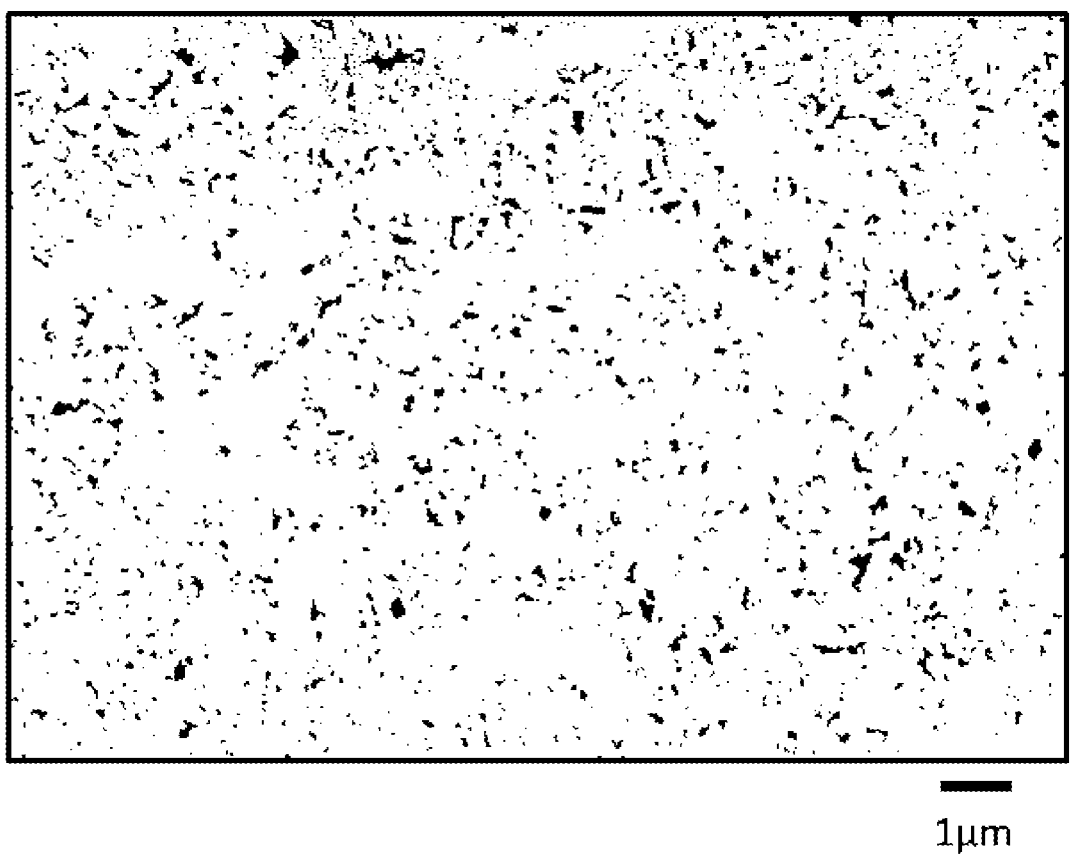
FIG. 3 shows an example of an image of a $WO_2$ portion confirmed based on a scanning electron microscope image (magnification: 10000 times) obtained by observing the cross section structure and a mapping image of a W element, a C element, and an O element using an EDX subjected to binarization processing, regarding the sintered body containing W—WC—$WO_2$ of the invention.

FIG. 2 shows an XRD chart measured regarding the present invention sintered body 3, but a peak of $W_2C$ could not be confirmed. In addition, FIG. 3 shows a scanning electron microscope image (magnification: 10000 times), observed regarding the cross section of the present invention sintered body 3.

The present invention sintered bodies 1 to 8 have fine organization structure in which all of average crystal grain sizes of crystal grain of W configuring the sintered body is small as 600 nm or less.

The present invention sintered bodies 1 to 8 have a high density, and according to the XRD measurement, the presence of $W_2C$ causing a decrease in strength could not be confirmed regarding the present invention sintered bodies other than the present invention sintered body 3.

In the present invention sintered bodies 1 to 8, a predetermined volume amount of the $WO_2$ particles dispersed in the structure was satisfied, and the average density of particles having a predetermined average grain size is also satisfied.

Even in a fracture toughness test, a high fracture toughness value was shown.

On the other hand, the comparative example sintered body 12 having the blending composition beyond the present invention range has the same sintering conditions as those of the present invention sintered body, but the density is deteriorated. In addition, the comparative example sintered body 15 under the sintering conditions beyond the present invention range was subjected to the high temperature sintering, and accordingly, generation of $W_2C$ is observed in the XRD measurement, and a predetermined fracture toughness value was not satisfied.

In the comparative example sintered bodies 11, 13, and 14, the raw material powder in which oxygen was applied under conditions beyond the present invention range (100° C. to 1300° C.) was used, and accordingly, the fracture toughness value was not satisfied.

Next, each cutting tool was produced by grinding process from the present invention sintered bodies 1 to 8 and the comparative example sintered bodies 11 to 15, a TiCN and $Al_2O_3$ layer was coated on the surface thereof by a CVD method, and a coating tool using present invention sintered body tools 1 to 8 and comparative example sintered body tools 11 to 15 was produced, and a high-speed feeding cutting process test was performed under cutting conditions shown below.

Work material: S45C
Cutting speed: 200 m/min
Depth: 1.0 mm
Feed: 0.7 mm

The cutting process test was performed up to the maximum cutting time of 180 seconds, and a blade edge was confirmed for every cutting time of 15 seconds. The test result is shown in Table 4.

From the result shown in Table 4, in the present invention sintered body tools 1 to 8, a dramatically long life was shown under the severe cutting conditions of high speed and high depth, and the present invention sintered body tools showed particularly excellent properties as a cutting tool in which a temperature of a blade edge easily becomes a high temperature.

In contrast, in the comparative example sintered body tools 11 to 15, the tool life time was short and fractures of the blade edge occurred.

TABLE 3

| | Sample no. | Blending composition (mass %) | | Average grain size (nm) | | Preprocessing condition of W | | | Sintering conditions | | | |
|---|---|---|---|---|---|---|---|---|---|---|---|---|
| | | W | WC | W | WC | Oxygenation | Temperature (° C.) | Holding time (min) | Sintering temperature (° C.) | Holding time (min) | Pressure (MPa) | Atmosphere |
| Present invention sintered body | 1 | 6.1 | 93.9 | 5 | 600 | Performed | 200 | 30 | 1200 | 5 | 5500 | Atmosphere |
| | 2 | 55.2 | 44.8 | 25 | 6800 | Performed | 1300 | 5 | 1200 | 5 | 5500 | $N_2$ |
| | 3 | 23.5 | 76.5 | 25 | 550 | Performed | 100 | 30 | 1200 | 5 | 4500 | $N_2$ |
| | 4 | 34.6 | 65.4 | 30 | 30 | Performed | 600 | 30 | 1200 | 5 | 4500 | Atmosphere |
| | 5 | 45.1 | 54.9 | 80 | 60 | Performed | 200 | 30 | 1200 | 5 | 4500 | Atmosphere |
| | 6 | 17.9 | 82.1 | 140 | 650 | Performed | 1000 | 30 | 1200 | 5 | 5500 | Atmosphere |
| | 7 | 34.5 | 65.5 | 5 | 15 | Performed | 600 | 30 | 1200 | 5 | 50 | Vacuum |
| | 8 | 21.3 | 78.7 | 40 | 8800 | Performed | 200 | 30 | 1200 | 5 | 4500 | $N_2$ |
| Comparative example sintered body | 11 | 23.5 | 76.5 | 25 | 600 | Performed | *No temperature process | | 1200 | 5 | 4500 | Atmosphere |
| | 12 | *1.3 | *98.7 | 5 | 600 | Performed | 700 | 30 | 1200 | 5 | 4500 | Atmosphere |
| | 13 | 23.5 | 76.5 | 30 | 500 | Performed | *50 | *5 | 1200 | 5 | 4500 | Atmosphere |
| | 14 | 23.5 | 76.5 | 30 | 500 | | *None | | 1200 | 5 | 4500 | $N_2$ |
| | 15 | 23.5 | 76.5 | 30 | 500 | Performed | 200 | 30 | *1600 | 5 | 4500 | Atmosphere |

Note)
*indicates that the condition of the invention is not satisfied.

TABLE 4

| | Sample no. | Volume amount of each component after sintering | | | Average crystal grain size | | | $WO_2$ Average density (particles/ $\mu m^2$) | Sintered body properties | | Fracture toughness value (MPa·$m^{1/2}$) | Tool properties Tool life time (after 180 seconds) |
|---|---|---|---|---|---|---|---|---|---|---|---|---|
| | | W (vol %) | WC (vol %) | $WO_2$ (vol %) | W (nm) | WC (nm) | $WO_2$ (nm) | | Density (g/cm³) | Presence or absence of XRD $WO_2$ peak | | |
| Present invention sintered body | 1 | 4 | 95 | 1 | 10 | 650 | 5 | 7 | 14.6 | Present | 6.9 | No fracture |
| | 2 | 45 | 50 | 4 | 173 | 6890 | 50 | 11 | 16.2 | Present | 6.8 | No fracture |
| | 3 | 15.5 | 80 | 4.5 | 181 | 623 | 130 | 17 | 15.3 | Present | 7.2 | No fracture |
| | 4 | 27.5 | 70 | 2.5 | 190 | 35 | 105 | 6 | 15.7 | Present | 7.0 | No fracture |
| | 5 | 35 | 60 | 5 | 293 | 68 | 150 | 20 | 15.8 | Present | 6.8 | No fracture |
| | 6 | 14.5 | 85 | 0.5 | 600 | 810 | 85 | 5 | 15.0 | Present | 6.7 | No fracture |
| | 7 | 26 | 70 | 4 | 10 | 20 | 20 | 10 | 15.4 | Present | 7.0 | No fracture |
| | 8 | 15 | 82 | 3 | 210 | 8950 | 70 | 14 | 15.2 | Present | 6.8 | No fracture |
| Comparative example sintered body | 11 | 5 | 80 | *15 | 183 | 656 | *350 | 8 | 14.9 | Present | 5.2 | *Fracture at 30 seconds |
| | 12 | *0 | *99 | 1 | 6 | 663 | *2 | *0.5 | 14.3 | Present | 4.7 | *Fracture at 15 seconds |
| | 13 | 15 | 80 | 5 | 176 | 610 | 120 | *25 | 15.2 | Present | 5.3 | *Fracture at 30 seconds |
| | 14 | 19.9 | 80 | *<0.1 | 183 | 617 | *3 | *0.02 | 15.7 | *Absent | 6.1 | *Fracture at 90 seconds |
| | 15 | *0 | 80 | *<0.1 | None | Not measurable | *2 | *0.01 | 15.8 | *Absent ($W_2C$ peak) | 5.0 | *Fracture at 15 seconds |

Note)
*indicates that the condition of the invention is not satisfied.

Note)
**is comparative example showing an example where WC and $W_2C$ are precipitated, but it is difficult to measure both elements separately, and therefore, the measurement cannot be performed.

INDUSTRIAL APPLICABILITY

The sintered body according to the invention has excellent compactness and excellent fracture toughness, and can be used as a blade edge material of a cutting tool or a wear-resistant tool material such as a mold used at a high temperature, and is extremely useful.

What is claimed is:

1. A sintered body comprising:
   4 to 50 vol % of tungsten metal as binder phase;
   50 to 95 vol % of tungsten carbide (WC); and
   0.5 to 5.0 vol % of tungsten oxide ($WO_2$),
   wherein the tungsten oxide ($WO_2$) has an average grain size of 5 nm to 150 nm and is present in a sintered body structure at an average density of 5 to 20 particles/$\mu m^2$, and
   the tungsten oxide ($WO_2$) is dispersed in the sintered body structure.

2. The sintered body according to claim 1, wherein the sintered body structure does not contain $W_2C$.

3. The sintered body according to claim 1, wherein a fracture toughness value of the sintered body is 6.7 MPa·$m^{1/2}$ or greater.

* * * * *